United States Patent
Nagaraju et al.

(10) Patent No.: US 11,277,407 B2
(45) Date of Patent: Mar. 15, 2022

(54) DISABLING MAC ADDRESS AGING TIME FOR AN INTERNET OF THINGS (IOT) DEVICE ON A NETWORK SWITCH

(71) Applicant: Hewlett Packard Enterprise Development LP, Houston, TX (US)

(72) Inventors: Yashavantha Nagaraju, Bangalore (IN); Nitin Singla, Bangalore (IN); Praveen Ramesh Ganjam, Bangalore (IN); Kunal Deshpande, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 544 days.

(21) Appl. No.: 16/112,669

(22) Filed: Aug. 25, 2018

(65) Prior Publication Data

US 2019/0089704 A1 Mar. 21, 2019

(30) Foreign Application Priority Data

Sep. 15, 2017 (IN) .......................... IN 201741032755

(51) Int. Cl.
*H04L 29/06* (2006.01)
*H04L 29/08* (2006.01)
(Continued)

(52) U.S. Cl.
CPC .......... *H04L 63/0876* (2013.01); *H04L 67/12* (2013.01); *H04L 69/28* (2013.01);
(Continued)

(58) Field of Classification Search
CPC ....... H04L 63/0876; H04L 67/12; H04W 4/70
(Continued)

(56) References Cited

U.S. PATENT DOCUMENTS 8,125,980 B2   2/2012  Hino et al.
8,249,065 B2   8/2012  Samprathi et al.
(Continued)

OTHER PUBLICATIONS

Ge, Yinglong, Xianchun Zhang, and Bo Han. "Complex IoT Control System Modeling from Perspectives of Environment Perception and Information Security." Mobile networks and applications 22.4 (2017): 683-691. (Year: 2017).*

(Continued)

*Primary Examiner* — Thanhnga B Truong
*Assistant Examiner* — Angela R Holmes
(74) *Attorney, Agent, or Firm* — Hewlett Packard Enterprise Patent Department

(57) ABSTRACT

Examples described relate to disabling of MAC address aging time for an IoT device on a network switch. In an example, in response to a device joining a network, a network switch in the network may determine a media access control (MAC) address of the device. The network switch may then send the MAC address to an authentication server. In response, the network switch may receive a Vendor Specific Attribute (VSA) associated with the MAC address from the authentication server. The VSA indicates that the MAC address relates to an IoT device. Based on the VSA, the network switch may recognize the MAC address of the device as a MAC address of the IoT device. In response to recognizing, the network switch may disable MAC address aging time for the MAC address of the IoT device on the network switch.

10 Claims, 4 Drawing Sheets

(51) Int. Cl.
*H04W 4/70* (2018.01)
*H04L 29/12* (2006.01)
*H04L 67/12* (2022.01)
*H04L 69/28* (2022.01)
*H04L 101/622* (2022.01)
*H04L 61/103* (2022.01)

(52) U.S. Cl.
CPC ............. *H04W 4/70* (2018.02); *H04L 61/103* (2013.01); *H04L 61/6022* (2013.01)

(58) Field of Classification Search
USPC .......................................................... 726/6
See application file for complete search history.

(56) References Cited

U.S. PATENT DOCUMENTS

| | | | | |
|---|---|---|---|---|
| 9,319,317 | B1* | 4/2016 | Spadaro | H04L 45/745 |
| 9,369,372 | B1* | 6/2016 | Kugel | H04L 49/70 |
| 2011/0196977 | A1* | 8/2011 | Lynch | H04W 8/186 |
| | | | | 709/229 |
| 2011/0243133 | A9* | 10/2011 | Villait | H04L 41/0806 |
| | | | | 370/392 |
| 2013/0163596 | A1* | 6/2013 | Zhang | H04L 45/18 |
| | | | | 370/392 |
| 2014/0119187 | A1 | 5/2014 | Song | |
| 2015/0143125 | A1* | 5/2015 | Nix | H04L 63/0272 |
| | | | | 713/171 |
| 2016/0072806 | A1* | 3/2016 | Kim | H04W 48/16 |
| | | | | 726/5 |
| 2016/0226732 | A1* | 8/2016 | Kim | H04L 12/2807 |
| 2017/0093834 | A1* | 3/2017 | Natu | H04L 12/2852 |
| 2017/0123478 | A1* | 5/2017 | Shen | G06F 1/3234 |
| 2017/0180380 | A1* | 6/2017 | Bagasra | H04L 63/10 |
| 2017/0251026 | A1* | 8/2017 | Straub | H04L 67/2842 |
| 2017/0353859 | A1* | 12/2017 | Idnani | H04W 12/08 |

OTHER PUBLICATIONS

Catalyst 6500 Release 12.2sx Software Configuration Guide, (Web Page), Retrieved Sep. 11, 2017, 14 Pgs.
Disable Mac Address Aging, (Web Page), Retrieved Sep. 11, 2017, 2Pgs.
"RADIUS Vendor-Specific Attributes (VSA)", Cisco IOS Security Configuration Guide, available online at <https://web.archive.org/web/20171120101952/https://www.cisco.com/c/en/us/td/docs/ios/12_2/security/configuration/guide/fsecur_c/scfrdat3.pdf>,Nov. 20, 2017, pp. SC-493-SC-502.
Cisco, "What is a Switch vs a Router?", available online at <https://web.archive.org/web/20190620011446/https://www.cisco.com/c/en_in/solutions/small-business/resource-center/networking/network-switch-what.html>, Jun. 20, 2019, 4 pages.
Investopedia, "Operating Expense", available online at <https://web.archive.org/web/20171228190712/https://www.investopedia.com/terms/o/operating_expense.asp>, Dec. 28, 2017, 2 pages.
J.B. Maverick, "What is the difference between CAPEX and OPEX?", available online at <https://web.archive.org/web/20171105061228/http://www.investopedia.com/ask/answers/020915/what-difference-between-capex-and-opex.asp>, Nov. 5, 2017, 3 pages.
Wikipedia, "Network switch", available online at <https://web.archive.org/web/20180820074905/https://en.wikipedia.org/wiki/Network_switch>, Aug. 20, 2018, 7 pages.
Wikipedia, "Operating expense", available online at <https://web.archive.org/web/20180521023208/https://en.wikipedia.org/wiki/Operating_expense>, May 21, 2018, 3 pages.

* cited by examiner

DISABLING MAC ADDRESS AGING TIME FOR AN INTERNET OF THINGS (IOT) DEVICE ON A NETWORK SWITCH

BACKGROUND

The Internet of Things (IoT) may be defined as a system of devices that are provided with unique identifiers that allow them to transfer data over a network. The devices may be embedded with sensors that enable these devices to collect and exchange data.

BRIEF DESCRIPTION OF THE DRAWINGS

For a better understanding of the solution, examples will now be described, purely by way of example, with reference to the accompanying drawings, in which.

DETAILED DESCRIPTION

In the Internet of Things, "things" may refer to a wide variety of devices such as heart monitoring implants, biochip transponders on farm animals, automobiles with built-in sensors, smart lights, and smart thermostat systems that may allow remote monitoring. Each "thing" may be assigned a unique identifier (for example, an IP address) and provided with the ability to collect and exchange data over a network.

In an example, the Internet of Things may include hundreds or thousands of devices on a network wherein the flow of data may be controlled, for example, via one or more network switches. A network switch may be communicatively coupled to hundreds of IoT devices. The network switch may store MAC addresses of the IoT devices in a switching table (or "MAC table"). When the aging time for a MAC address in the table expires, the address is removed.

IoT devices may be designed to operate when required and sleep rest of the time to enable power and bandwidth savings. Typically, an IoT device not communicating may put itself into a sleep mode and not transmit any data. This may lead to aging out of the MAC address of the IoT device on the network switch. In a scenario, when an upstream device wants to talk to the IoT device which is in sleep mode, the switch broadcasts the messages to all the connected ports since it doesn't find an entry in the MAC table as the MAC address is aged out. This in turn may wake up all the devices connected to each of those ports. Thus, even when the packet was meant to be for a specific MAC address, it may end up disturbing the entire network infrastructure, leading to consumption of both power and network resources. Needless to say, this is not a desirable scenario.

To address these technical challenges, the present disclosure describes various examples for disabling MAC address aging time for an IoT device on a network switch. In an example, in response to a device joining a network, a network switch in the network may determine a media access control (MAC) address of the device. The network switch may then send the MAC address to an authentication server. In response, the network switch may receive a Vendor Specific Attribute (VSA) associated with the MAC address from the authentication server. The VSA may indicate that the MAC address relates to an Internet of Things (IoT) device. Based on the VSA, the network switch may recognize the MAC address of the device as a MAC address of the IoT device. In response to recognizing, the network switch may disable MAC address aging time for the MAC address of the IoT device on the network switch.

Examples described herein may help in reducing the operating expenses for an organization by reducing the number of broadcast messages on a network switch. The reduction in broadcast messages may ensure that all IoT devices communicatively coupled to the devices don't wake up thereby reducing power consumption and enhancing performance.

Figure 1:
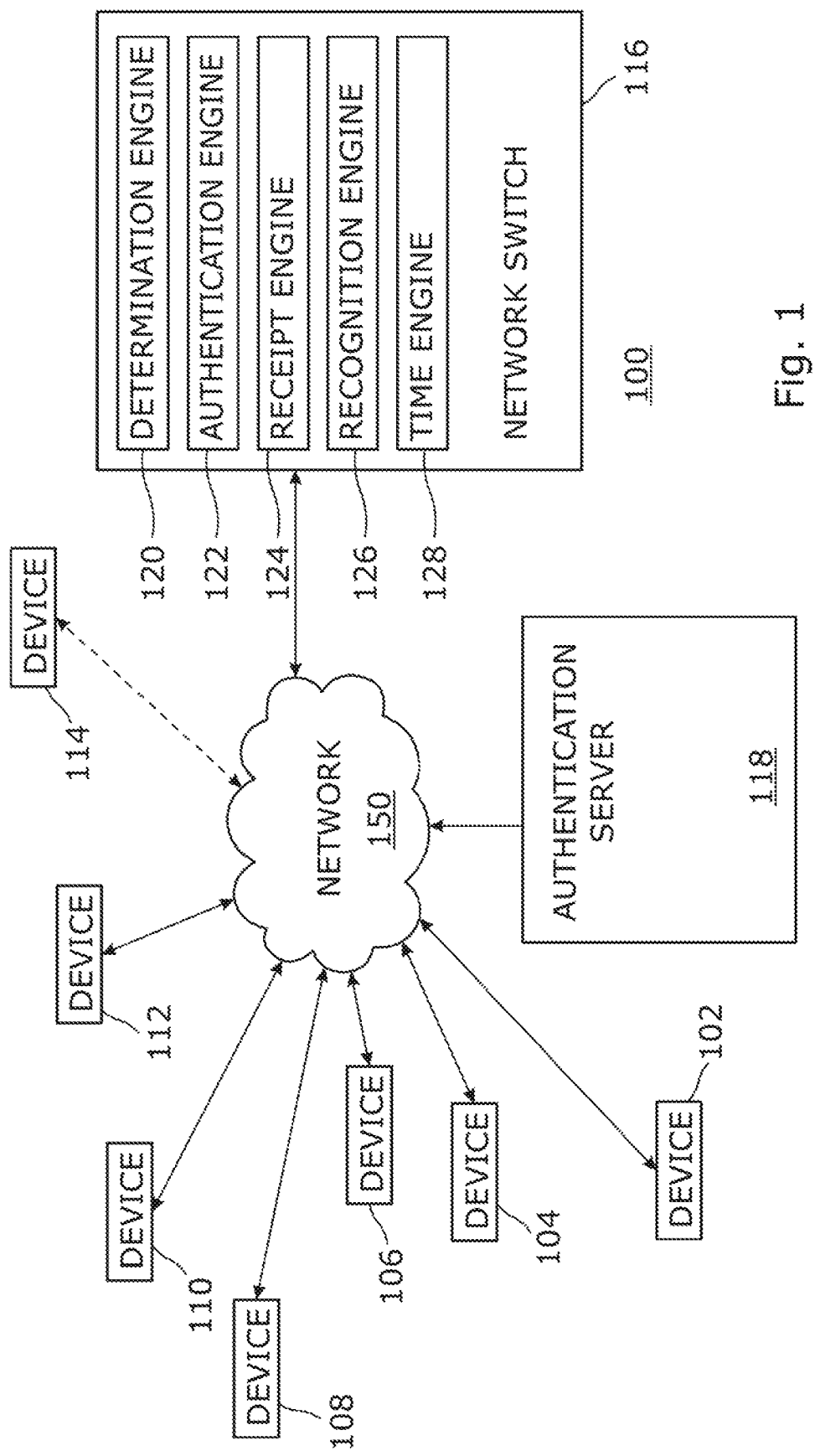
FIG. 1 is a block diagram of an example computing environment for disabling MAC address aging time for an Internet of Things (IoT) device on a network switch.

FIG. 1 is a block diagram of an example computing environment 100 for disabling MAC address aging time for an IoT device on a network switch. In an example, computing environment 100 may include devices 102, 104, 106, 108, 110, and 112, a network switch 116, and an authentication server 118. Although six devices are shown in FIG. 1, other examples of this disclosure may include more or less than six devices. In an example, computing environment 100 may include hundreds or thousands of such devices. In an example, devices 102, 104, 106, 108, 110, and 112 may be referred to as "IoT devices".

In an example, devices 102, 104, 106, 108, 110, and 112 may represent any type of system capable of executing machine-readable instructions. For example, devices 102, 104, 106, 108, 110, and 112 may represent embedded computing devices that transmit and receive information over a network (for example, 150). Some non-limiting examples of devices 102, 104, 106, 108, 110, and 112 may include a desktop computer, a notebook computer, a tablet computer, a thin client, a mobile device, a personal digital assistant (PDA), a phablet, a server, a printer, a network device, an automobile, a clock, a lock, a refrigerator, an enterprise security system, and a coffee maker.

Devices 102, 104, 106, 108, 110, and 112 may each include a sensor(s). The sensor(s) may be used to detect events or changes in the environment of the respective devices, and then provide a corresponding output. The sensor(s) may provide various types of output, for example, an electrical signal or an optical signal. Some non-limiting examples of the sensor that may be present or embedded on devices 102, 104, 106, 108, 110, and 112 may each include a pressure sensor, a motion sensor, a light sensor, an infrared sensor, a humidity sensor, a gas sensor, an acceleration sensor, a color sensor, and a gyro sensor. In an example, devices 102, 104, 106, 108, 110, and 112 may each include an actuator. Examples of the actuator may include an electric motor, a hydraulic cylinder, a piezoelectric actuator, and a pneumatic actuator.

Devices 102, 104, 106, 108, 110, and 112 may be communicatively coupled, for example, via a network 150. In an example, the network may be an IoT network. Network 150 may be a wireless (for example, a cellular network) or a wired network. Network 150 may include, for example, a Local Area Network (LAN), a Wireless Local Area Network (WAN), a Metropolitan Area Network (MAN), a Storage Area Network (SAN), a Campus Area Network (CAN), or the like. Further, network 150 may be a public network (for example, the Internet) or a private network (for example, an intranet). Devices 102, 104, 106, 108, 110, and 112 may use wired and/or wireless technologies for communication. Examples of wireless technologies may include Radio-frequency identification (RFID), Near-field Communication (NFC), optical tags, Bluetooth low energy (BLE), ZigBee, Thread, LTE-Advanced, and WiFi-Direct. Devices 102, 104, 106, 108, 110, and 112 may communicate data and/or signals with each other. In an example, network may include one or more network switches (for example, network switch 116)

In an example, authentication server 118 may represent any type of system capable of executing machine-readable instructions. Some non-limiting examples of authentication server 118 may include a server, a desktop computer, a notebook computer, a tablet computer, and a thin client. As used herein, the term "server" may include a computer and/or a computer program (machine-readable instructions) that may process requests from other (client) computers over a network.

Devices 102, 104, 106, 108, 110, and 112 may each be in communication with authentication server 118, for example, via a computer network. Such a computer network may be similar to the computer network described above.

In an example, network switch 116 may include a determination engine 120, an authentication engine 122, a receipt engine 124, a recognition engine 126, and a time engine 128. Engines 120, 122, 124, 126, and 128 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of network switch 116. In some examples, the at least one machine-readable storage medium may store instructions that, when executed by the at least one processing resource, at least partially implement some or all engines of the computing device. In such examples, network switch 116 may include the at least one machine-readable storage medium storing the instructions and the at least one processing resource to execute the instructions.

In an example, determination engine 120 may determine, in response to a device (for example, 114) joining a network (for example, 150), a media access control (MAC) address of device 114. In an example, device 114 may include an IoT device similar to a device described earlier in the context of devices 102, 104, 106, 108, 110, and 112. In an example, the MAC address of device 114 may be determined through an Address Resolution Protocol (ARP) request which may be used to map an Internet Protocol address (IP address) to a physical machine address that is recognized in the network.

Once the MAC address of device 114 is determined by determination engine 120, authentication engine 122 may send the MAC address to an authentication server 118 for authenticating the MAC address. In an example, authentication server 118 may include a Remote Authentication Dial-In User Service (RADIUS) server. The RADIUS server may refer to an authentication server 118 that operates according to the RADIUS protocol, which is a networking protocol that enables remote access servers to communicate with a central server to authenticate users and authorize their access to the requested system or service. Authentication server 118 may include a profile for device 114. The profile may include a username and a password, both of which, in an example, may be populated with the MAC address of device 114. In an example, a Vendor Specific Attribute (VSA) may be associated with the MAC address of device 114. The Internet Engineering Task Force (IETF) defines Vendor-Specific Attributes (VSA) as a method for communicating vendor-specific information between network switch 116 and authentication server 118. Attribute 26 encapsulates vendor specific attributes, thereby, allowing vendors to support their own extended attributes otherwise not suitable for general use. In an example, the VSA may be associated with the MAC address of device 114 in a profile of device 114 on authentication server 118. Thus, the VSA of device 114 may be stored along with its profile on authentication server 118. In an example, the VSA may indicate that the MAC address relates to an IoT device. In other words, device 114 is an IoT device. In an example, a specific value may be assigned to the VSA to indicate that the MAC address relates to an IoT device. For example, if "IOT-VSA" is used to designate the VSA, IOT_VSA=1 may indicate that the device is an IoT device. On the other hand, if IOT_VSA=0, it may indicate that the device is a non-IoT device.

Once the MAC address is authenticated by authentication server 118, authentication server 118 may provide the VSA associated with the MAC address to network switch 116. Receipt engine 124 on network switch 116 may receive the VSA associated with the MAC address from authentication server 118.

Based on the received VSA, recognition engine 126 may determine whether the MAC address of device 114 is a MAC address of an IoT device. In response to a determination that the MAC address of device 114 is a MAC address of an IoT device, recognition engine 126 may recognize the MAC address as a MAC address of the IoT device.

In response to the recognition by recognition engine 126, time engine 128 may disable MAC address aging time for the MAC address of the IoT device on network switch 116. In an example, network switch 116 may store MAC addresses of devices (for example, device 114) that it learns in a switching table (or "MAC table"). Along with a MAC address, network switch 116 may also store information related to the interface on which the traffic was received and the time when the address was learned in the MAC table.

Network switch 116 may use a mechanism called aging to keep the MAC table current. As mentioned earlier, for each MAC address in the MAC table, network switch 116 may record a timestamp of when the information about the device was learned. Each time the switch detects traffic from a MAC address that is in its MAC table, it updates the timestamp of that MAC address. A timer on network switch 116 may periodically check the timestamp, and if the MAC address of a device is older than the value set, network switch 116 may remove that MAC address from the MAC table. Thus, network switch 116 may track only active MAC addresses on the network. Those MAC addresses that are no longer available may be flushed out from the MAC table by network switch 116. In an example, disabling MAC address aging time for the MAC address of the IoT device may include disabling MAC address aging time for the MAC address of the IoT device on a port where the IoT device is communicatively coupled to network switch 116.

Figure 2:
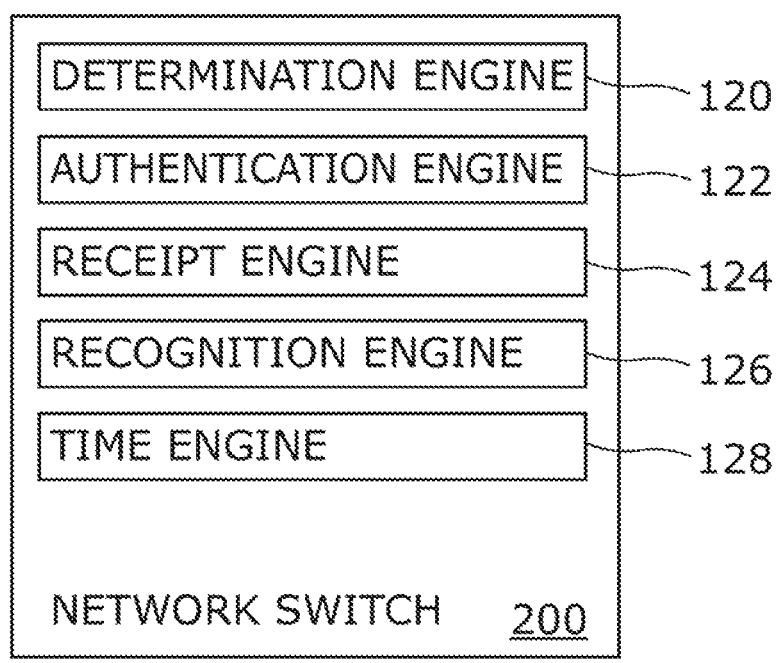
FIG. 2 is a block diagram of an example network switch for disabling MAC address aging time for an Internet of Things (IoT) device.

FIG. 2 is a block diagram of an example network switch 200 for disabling MAC address aging time for an Internet of Things (IoT) device. In an example, network switch 200 may be analogous to network switch 116 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, network switch 200 may include a determination engine 120, an authentication engine 122, a receipt engine 124, a recognition engine 126, and a time engine 128.

In an example, determination engine 120 may determine, in response to a device joining a network, a media access control (MAC) address of the device. Authentication engine 122 may send the MAC address to a Remote Authentication Dial-In User Service (RADIUS) server. In response, receipt engine 124 may receive a Vendor Specific Attribute (VSA) associated with the MAC address from the RADIUS server. The VSA may indicate that the MAC address relates to an Internet of Things (IoT) device. Recognition engine 126 may recognize, based on the VSA, the MAC address of the device as a MAC address of the IoT device. In response to the recognition, time engine 128 may disable MAC address aging time for the MAC address of the IoT device on the network switch.

In an example, if after disabling the MAC address aging time for the MAC address of the IoT device, network switch 200 determines that the IoT device has been removed from the network, network switch 200 may enable the MAC address aging time for the MAC address on network switch. In another example, if after disabling the MAC address aging time for the MAC address of the IoT device, network switch 200 determines that link flapping has occurred on a port where the IoT device was communicatively coupled to network switch, network switch 200 may enable the MAC address aging time for the MAC address on network switch. Link flap means that the interface continually goes up and down on network switch 200. The interface may be put into a disabled state if it flaps more than a pre-defined number of times (for example, 5 times) in a pre-defined period (for example, 10 seconds).

Figure 3:
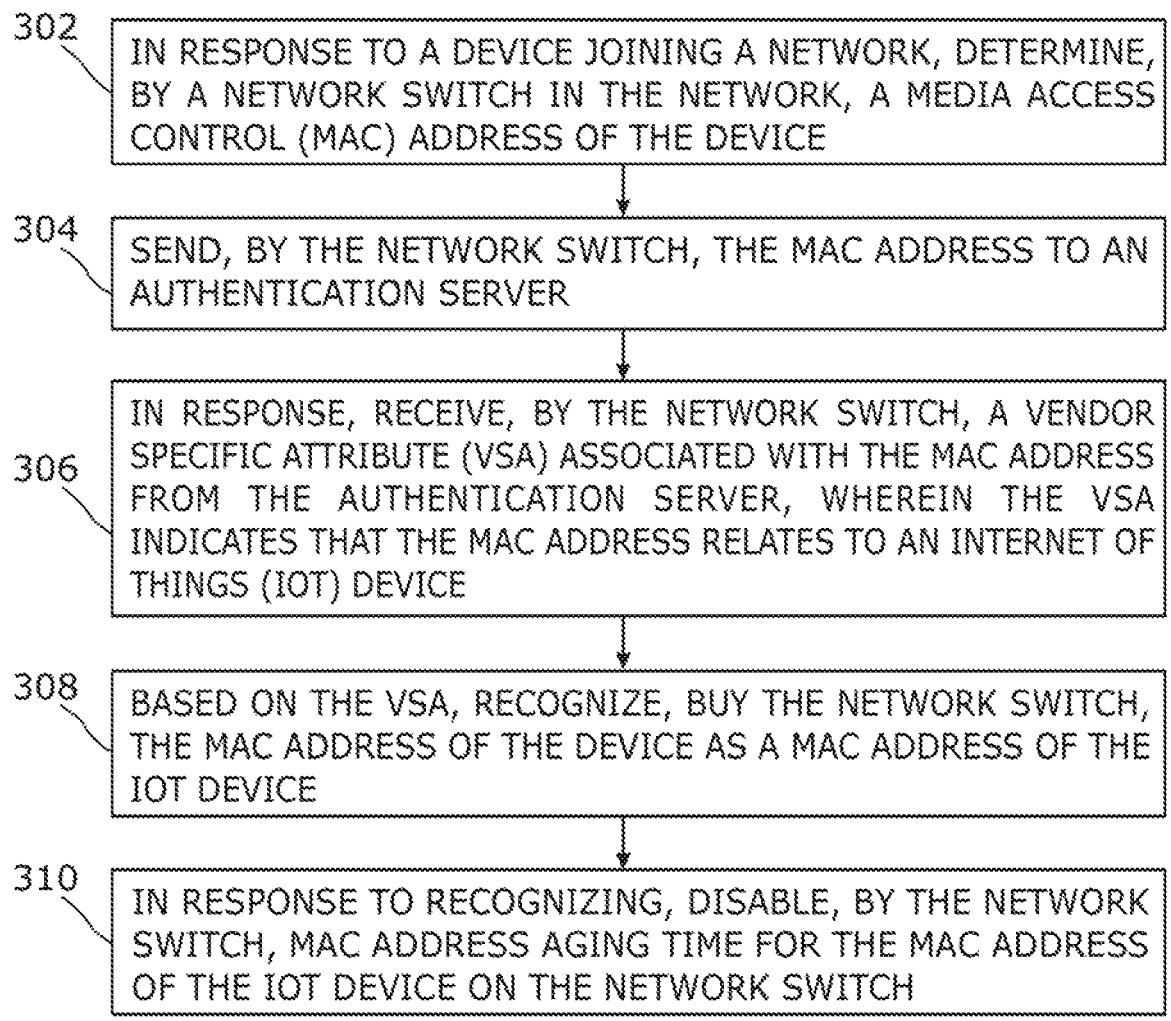
FIG. 3 is a flowchart of an example method of disabling MAC address aging time for an Internet of Things (IoT) device on a network switch.

FIG. 3 is a flowchart of an example method 300 of disabling MAC address aging time for an Internet of Things (IoT) device on a network switch. The method 300, which is described below, may be executed on a network switch such as network switch 116 of FIG. 1 or network switch 200 of FIG. 2. However, other network devices with routing functionality may be used as well.

At block 302, in response to a device joining a network, a network switch in the network may determine a media access control (MAC) address of the device. In an example, the network may include a plurality of devices (for example, 102, 104, 106, 108, 110, and 112). At block 304, the network switch may send the MAC address to an authentication server. In response, at block 306, the network switch may receive a Vendor Specific Attribute (VSA) associated with the MAC address from the authentication server. The VSA may indicate that the MAC address relates to an Internet of Things (IoT) device. At block 308, based on the VSA, the network switch may recognize the MAC address of the device as a MAC address of the IoT device. At block 310, in response to recognizing, the network switch may disable MAC address aging time for the MAC address of the IoT device on the network switch.

Figure 4:
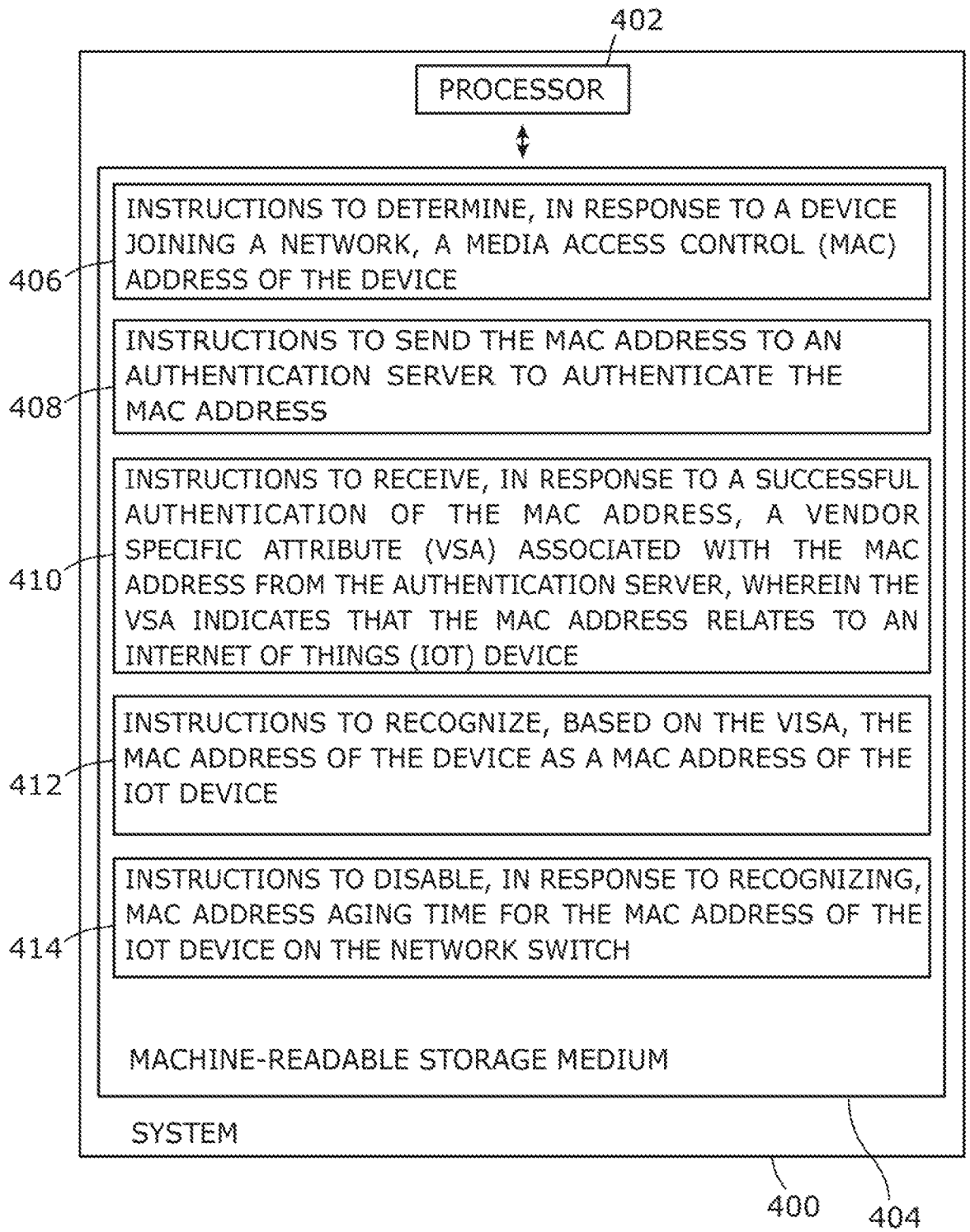
FIG. 4 is a block diagram of an example system including instructions in a machine-readable storage medium for disabling MAC address aging time for an Internet of Things (IoT) device on a network switch.

FIG. 4 is a block diagram of an example system 400 for disabling MAC address aging time for an Internet of Things (IoT) device on a network switch. System 400 includes a processor 402 and a machine-readable storage medium 404 communicatively coupled through a system bus. In some examples, system 400 may be analogous to network switch 116 of FIG. 1 or network switch 200 of FIG. 2. Processor 402 may be any type of Central Processing Unit (CPU), microprocessor, or processing logic that interprets and executes machine-readable instructions stored in machine-readable storage medium 406. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, 410, 412, and 414. In an example, instructions 406 may be executed by processor 402 to determine, in response to a device joining a network, a media access control (MAC) address of the device. Instructions 408 may be executed by processor 402 to send the MAC address to an authentication server to authenticate the MAC address. Instructions 410 may be executed by processor 402 to receive, in response to a successful authentication of the MAC address, a Vendor Specific Attribute (VSA) associated with the MAC address from the authentication server. The VSA may indicate that the MAC address relates to an Internet of Things (IoT) device. Instructions 412 may be executed by processor 402 to recognize, based on the VSA, the MAC address of the device as a MAC address of the IoT device. Instructions 414 may be executed by processor 402 to disable, in response to the recognition, MAC address aging time for the MAC address of the IoT device on the network switch.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

We claim:

1. A method comprising:
   in response to a device joining a network, determining, by a network switch in the network, a media access control (MAC) address of the device;
   sending, by the network switch, the MAC address to an authentication server;
   in response, receiving, by the network switch, a Vendor Specific Attribute (VSA) associated with the MAC address from the authentication server, wherein the VSA indicates that the MAC address relates to an Internet of Things (loT) device;
   based on the VSA, recognizing, by the network switch, the MAC address of the device as a MAC address of the loT device; and
   in response to recognizing, disabling, by the network switch, MAC address aging time for the MAC address of the loT device on the network switch.

2. The method of claim 1, further comprising:
   assigning a specific value to the VSA to indicate that the MAC address relates to the loT device.

3. The method of claim 1, wherein the MAC address aging time for the MAC address is disabled in a MAC table on the network switch.

4. The method of claim 1, further comprising:
   enabling, by the network switch, the MAC address aging time for the MAC address on the network switch if the loT device is removed from the network.

5. The method of claim 1, wherein the MAC address is sent to the authentication server for authenticating the MAC address.

6. A network switch comprising:
   a processor; and
   a machine-readable medium storing instructions that, when executed by the processor, cause the processor to:
   determine, in response to a device joining a network, a media access control (MAC) address of the device;
   send the MAC address to a Remote Authentication Dial-In User Service (RADIUS) server;
   receive a Vendor Specific Attribute (VSA) associated with the MAC address from the RADIUS server, wherein the VSA indicates that the MAC address relates to an Internet of Things (loT) device;
   recognize, based on the VSA, the MAC address of the device as a MAC address of the loT device; and
   disable, in response to recognition, MAC address aging time for the MAC address of the loT device on a port where the device is communicatively coupled to the network switch.

7. The network switch of claim 6, wherein the VSA is assigned a specific value to indicate that the MAC address relates to the loT device.

8. The network switch of claim 6, wherein the VSA is associated with the MAC address on the RADIUS server.

9. A non-transitory machine-readable storage medium comprising instructions, the instructions executable by a processor to:
   determine, in response to a device joining a network, a media access control (MAC) address of the device;
   send the MAC address to an authentication server to authenticate the MAC address;
   receive, in response to a successful authentication of the MAC address, a Vendor Specific Attribute (VSA) associated with the MAC address from the authentication server, wherein the VSA indicates that the MAC address relates to an Internet of Things (loT) device;
   recognize, based on the VSA, the MAC address of the device as a MAC address of the loT device; and
   disable, in response to recognizing, MAC address aging time for the MAC address of the loT device on the network switch.

10. The storage medium of claim 9, wherein the VSA is received in response to a successful authentication of the MAC address by the authentication server.

* * * * *